(12) United States Patent
Yamaguchi et al.

(10) Patent No.: US 6,495,939 B1
(45) Date of Patent: Dec. 17, 2002

(54) CORELESS MOTOR HAVING TUBULAR HOUSING WITH END MOUNTING PORTIONS

(75) Inventors: Tadao Yamaguchi, Isesaki (JP); Manabu Shindou, Isesaki (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 12 days.

(21) Appl. No.: 09/586,979

(22) Filed: Jun. 5, 2000

(51) Int. Cl.⁷ .............................. H02K 7/06; H02K 7/10; H02K 7/65; H02K 7/75
(52) U.S. Cl. ........................................................ 310/81
(58) Field of Search ........................ 310/270, 81, 759, 310/40, 71, 261; 340/407

(56) References Cited

U.S. PATENT DOCUMENTS

| | | | | |
|---|---|---|---|---|
| 3,631,274 A | * | 12/1971 | Stauder | 310/66 |
| 4,262,549 A | * | 4/1981 | Schwellenbach | 74/87 |
| 5,107,155 A | * | 4/1992 | Yamaguchi | 310/81 |
| 5,341,057 A | * | 8/1994 | Yamaguchi et al. | 310/261 |
| 5,373,207 A | * | 12/1994 | Yamaguchi et al. | 310/81 |
| 5,801,466 A | * | 9/1998 | Odagiri et al. | 310/81 |
| 5,952,745 A | * | 9/1999 | Yasuda | 310/40 |
| 5,982,055 A | * | 11/1999 | Matsushita et al. | 310/40 MM |
| 6,140,724 A | * | 10/2000 | Lee | 310/40 MM |
| 6,140,741 A | * | 10/2000 | Tamai et al. | 310/323.13 |

* cited by examiner

Primary Examiner—Nestor Ramirez
Assistant Examiner—Julio Gonzalez Ramirez
(74) Attorney, Agent, or Firm—Leydig, Voit & Mayer, Ltd.

(57) ABSTRACT

A slim cylindrical coreless motor for mounting in a device without using an additional mounting element. The slim cylindrical coreless motor has a cylindrical case having a bearing holder at a first end and an end bracket fitted to the second end of the cylindrical case. The slim cylindrical coreless motor has first mounting portions extending outward from the first end of the cylindrical case and second mounting portions extending outward from the end bracket. The first and second mounting portions do not extend beyond the circumference of the case, and at least one of the first and second mounting portions is a power supply terminal. In addition, a weight is eccentrically mounted on a shaft extending out of the case, which enables the motor to be used as a vibrator motor. The weight has a recess near the first mounting portions. The slim cylindrical coreless motor does not require a holder for attachment to a device, which decreases the circumference of the motor, so that the motor can be mounted within a smaller area.

1 Claim, 8 Drawing Sheets

CORELESS MOTOR HAVING TUBULAR HOUSING WITH END MOUNTING PORTIONS

BACKGROUND OF THE INVENTION

1. Field of the Invention

The present invention relates to an improved slim tubular coreless motor applicable to a soundless alarming means for a mobile wireless communications device, and, more particularly, to a slim tubular coreless motor which requires only a small mounting area.

2. Description of the Related Art

Referring to FIG. 7, a conventional cylindrical direct current motor M has a semi-circular weight W eccentrically mounted on an output shaft S, the motor vibrates by centrifugal force produced with rotation of the eccentric weight W to the shaft S, and thus it can be utilized as a soundless alarming means by the vibration.

As shown in FIG. 8, the conventional motor M is mounted on, for example, a common printed circuit board (P) by soldering. For the mounting of the motor M on the board, a holder F is needed, which increases the mounting area.

SUMMARY OF THE INVENTION

An object of the present invention is to provide a slim cylindrical coreless motor, which only requires a small mounting area, so that a holder, which increases the diameter of a motor, is not required for mounting.

The above object is achieved by a slim tube-type coreless motor comprising: a tube-type case having a bearing holder at one end portion thereof; an end bracket fitted to the other end of the tube-type case; one or more first fixing portions extending from a part of the one end portion of the tube-type case; and second fixing portions formed at the end bracket, wherein the slim-type coreless motor is horizontally mounted in a device without an additional fixing means.

In one embodiment, the one or more first fixing portions may extend from a part of the bearing holder. Preferably, the first and second fixing portions are formed so as not to extend beyond the circumference of the case. Preferably, at least part of the first and second fixing portions is used as a power supply terminal.

For using the motor as a vibrator motor, it is preferable that an eccentric weight is mounted around a shaft extending out of the case, and the eccentric weight has a recessed portion near the first fixing portions.

The slim tube-type coreless motor according to the present invention, having the above-described configuration, can reduce the mounting area and can be mounted on a PCB by soldering without increasing the circumference thereof.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE INVENTION

Figure 1:
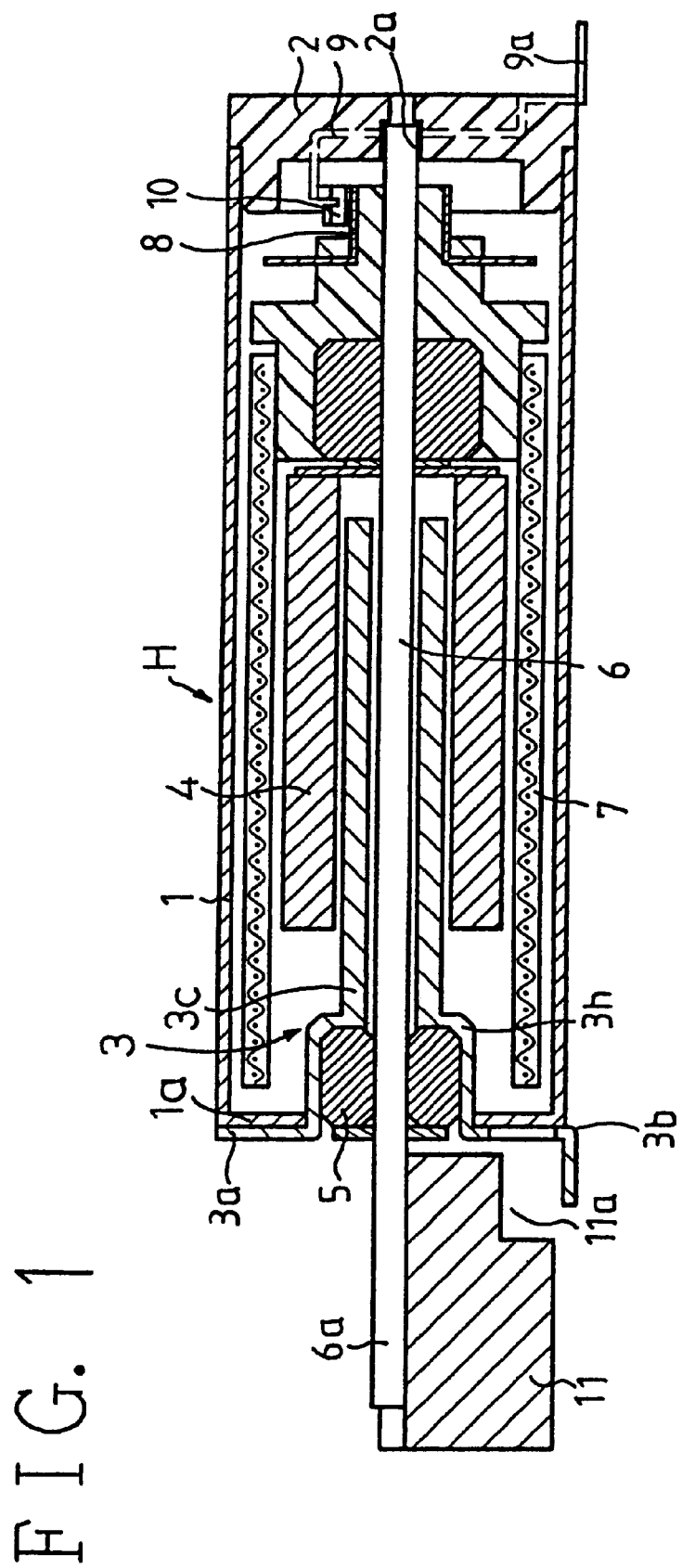
FIG. 1 is a sectional view of a preferred embodiment of a slim cylindrical coreless vibrator motor having an weight eccentrically mounted on the output shaft according to the present invention.
Figure 2:
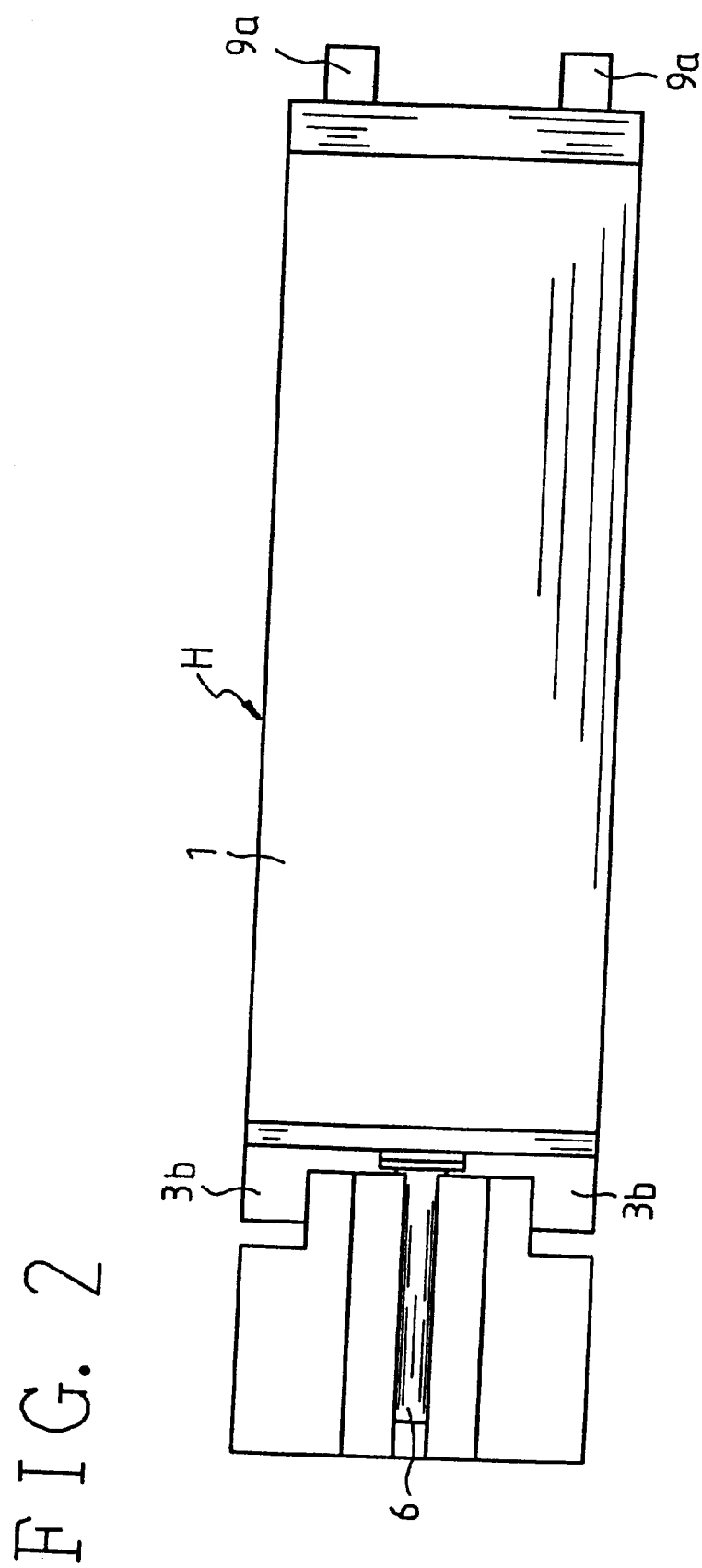
FIG. 2 is a plan view of the motor shown in FIG. 1.
Figure 3:
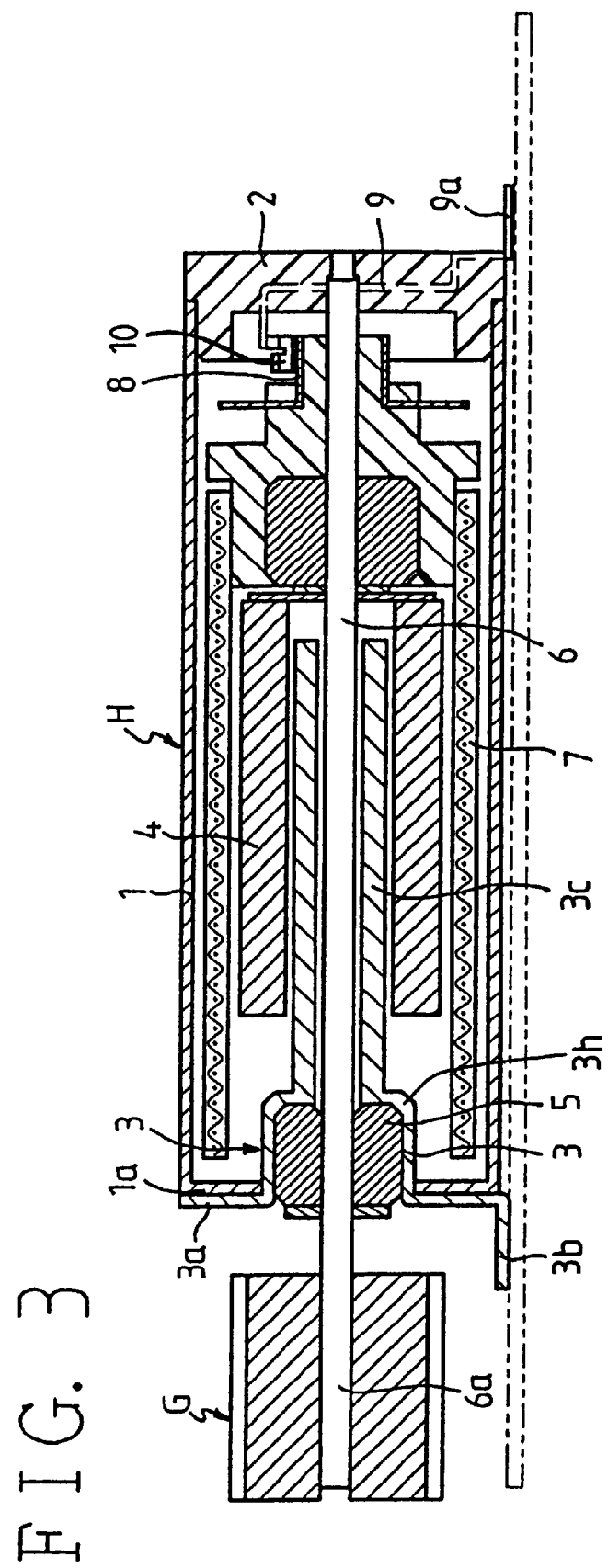
FIG. 3 is a sectional view of a rotary coreless motor.

Referring to FIGS. 1 through 3, the housing H of the slim tube-type coreless vibrator motor according to a preferred embodiment of the present invention includes a tubular case 1 having a diameter of about 4 mm, and an end bracket 2 made of slippery resin, which is fitted to one open end of the case 1. An end portion 1a at the opposite end to the end bracket 2 is bent inward, leaving a center hole.

A bearing holder 3 has a support portion 3h having an outer diameter smaller than that of the center hole 1b and including the end portion 1a. The end of the bearing holder 3, opposite to the support portion, is bent outward to form a flange 3a, which overlaps the end portion 1a. The flange 3a is connected to the outer side of the end portion 1a by spot welding.

A part of the flange 3a of the bearing holder 3, which is spot welded to the end portion 1a, is bent in the axial direction along the outer circumference of the case 1, which results in a first fixing portion 3b.

As shown in FIG. 2, the first fixing portion 3b does not project from the outer circumference of the case 1. A magnetic return path plate 3c is a hollow tube having a diameter smaller than that of the central hole of the case 1. In addition, a tubular magnet 4 is installed around the magnetic return path plate 3c and spaced from the inner circumference of the case 1.

A bearing 5 is installed in the support holder portion 3h, as shown in FIG. 1, and rotatably supports a shaft 6 in conjunction with a bearing hole 2a formed in the end bracket 2 made of slippery resin. A tubular rotor 7 formed of a coreless coil, on which a magnetic field produced by the tubular magnet 4 is exerted, is mounted within the case 1 and combined with a cylindrical commutator 8 installed near the end bracket 2, so as not to contact the tubular magnet 4 and the inner side of the case 1. The coreless coil is wound on a support which is removed after winding the coil so that the coil is internally empty and other elements may be inserted inside the coil as shown, for example, in FIG. 1. A pair of brushes 10, the bases of which are spot welded to the inner end of a power supply terminal 9 in the end bracket 2, slidably contact the cylindrical commutator 8 while applying a predetermined pressure.

As shown in FIG. 2, a pair of power supply terminals 9 extend out of the end bracket 2 along the axial direction, to form a pair of second fixing portions 9a, which are bent corresponding to the first fixing portion 3b at the opposite side, so as not to extend beyond the circumference of the case 1.

The weight 11 having a recessed portion 11a, which is formed by cutting away a predetermined portion of the weight 11 to enable the first fixing portion 3b to be bent, is eccentrically coupled to the output end 6a of the shaft 6 by caulking. As a result, as the weight 11 rotates, the centrifugal force generates vibration.

In the present embodiment, the vibrator motor with the eccentric weight 11 is illustrated. However, the present invention can be applied to a common rotary geared motor with a gear G, as shown in FIG. 3. The rotary geared motor shown in FIG. 3 has the same configuration as the motor shown in FIG. 2, except that the gear G is adopted instead of the eccentric weight 11. The same reference numerals are used to refer to the same elements as in FIG. 1, and description of those elements is omitted.

Figure 4:
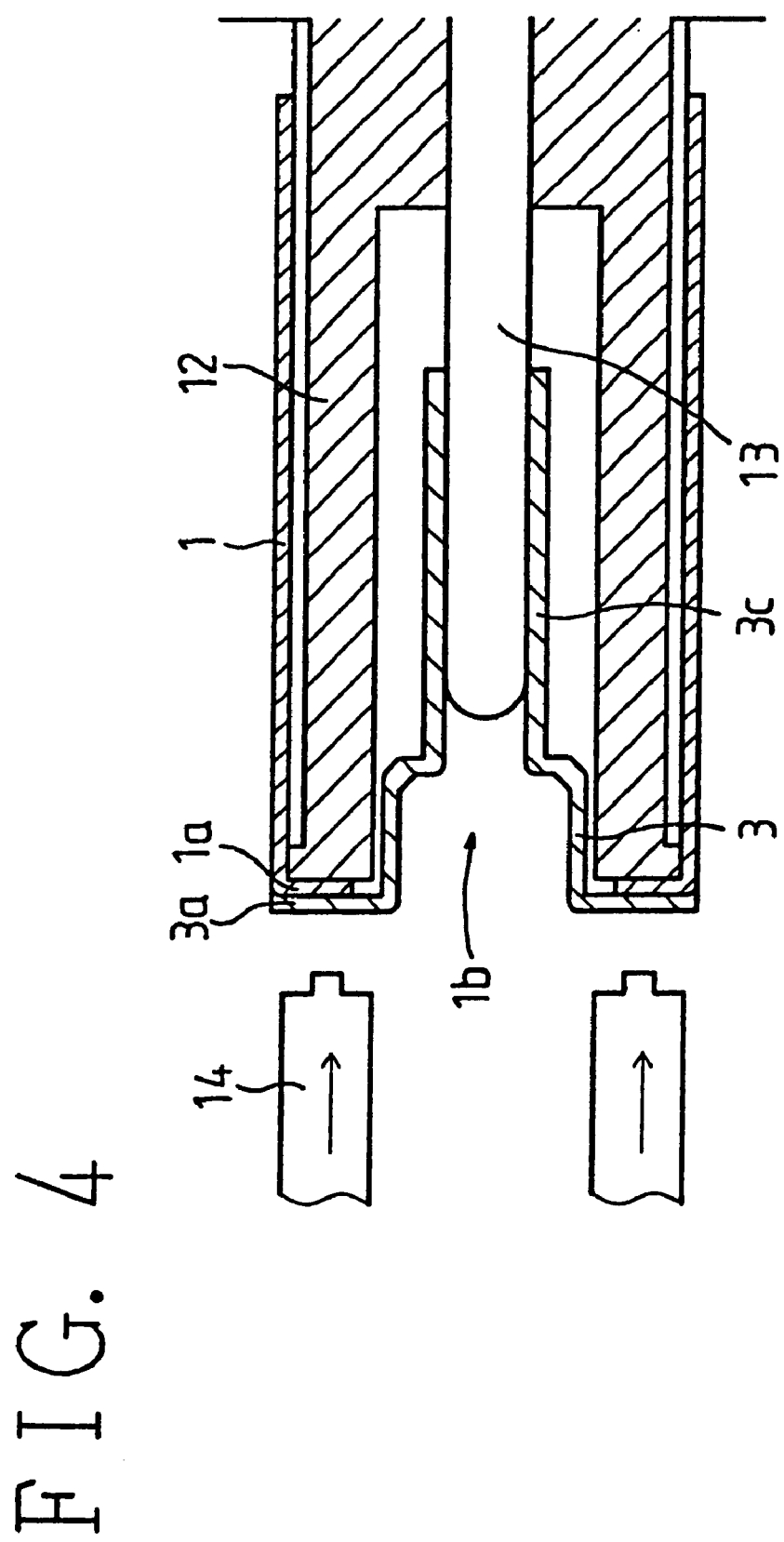
FIG. 4 is a sectional view illustrating connection between the cylindrical case and the bearing holder of the coreless motor of FIG. 3.

The case 1 and the bearing holder 3 are coupled as follows. Referring to FIG. 4, a pair of electrodes 12 fixed to both sides of a guide pin 13, which also function as positioning jigs, are placed into the case 1 while the guide pin 13 slides into the hollow of the return path plate portion 3c. Then, a pair of movable electrodes 14 are applied to enable spot welding between the flange 3a and the end portion 1a. For accurately controlling the assembly of the case 1 and the bearing holder 3, to allow for uniform space between the return path plate portion 3c and the inner circumference of the case 1, the center hole of the end portion 1a is designed to be much larger than the outer circumference of the support portion which is formed inwards from the flange 3a of the bearing holder 2 to receive the bearing 5 (see FIG. 1), such that the end portion 1a and the flange 3a of the bearing holder 3 are slidably movable while being overlapped with each other.

Figure 5:
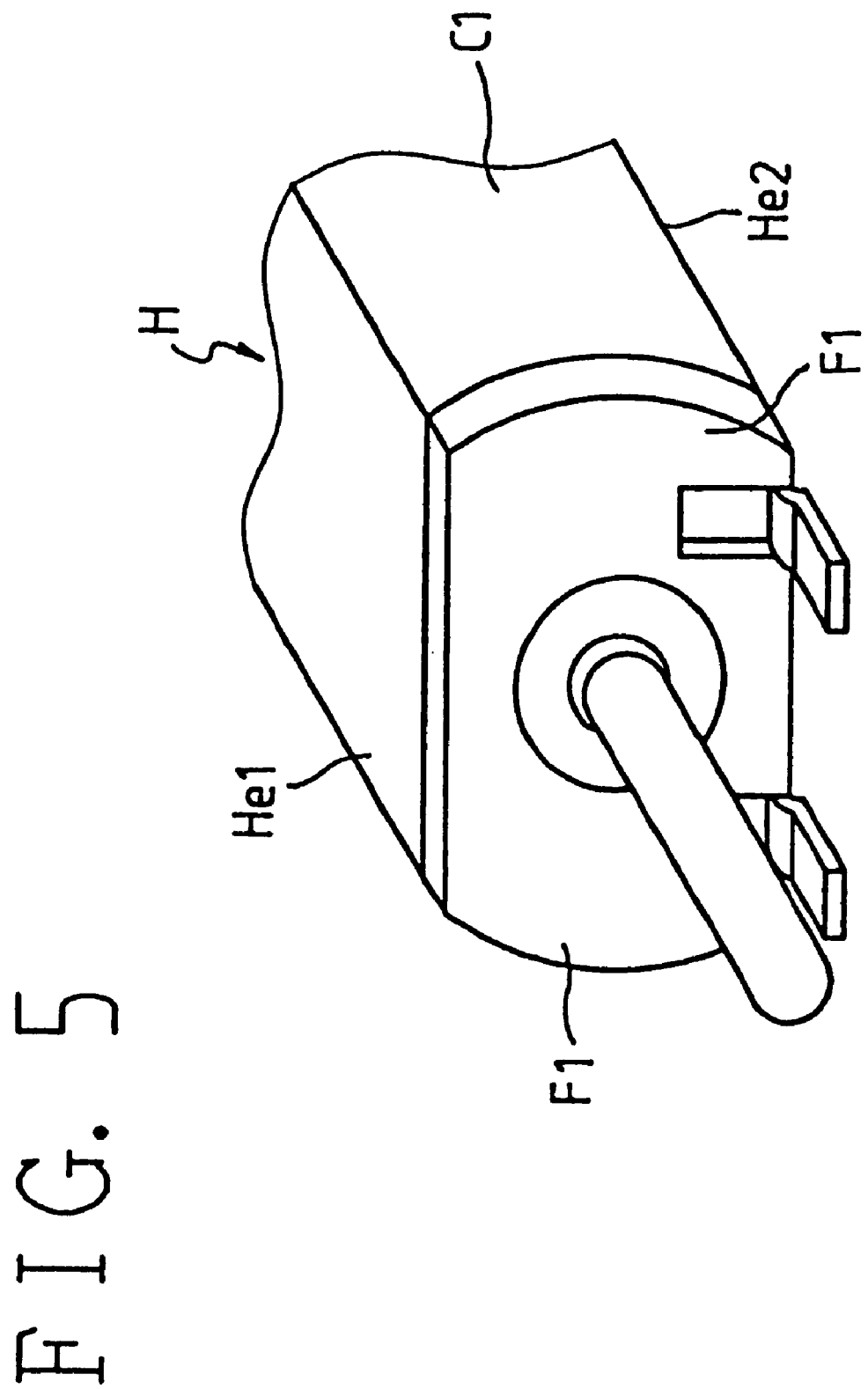
FIG. 5 is a perspective view of another embodiment of the slim cylindrical coreless vibrator motor, which shows the main parts thereof.

FIG. 5 shows another embodiment of the vibrator motor according to the present invention. As shown in FIG. 5, the housing H does not have a circular cross section and has two planar portions He1 and He2 which are parallel to each other, and convex sides. In other words, a portion of the housing is flat, forming a racing-track-like cross section. The end portion of the case C1, at the opposite end of the end bracket (not shown), is also bent toward the center of the case C1, leaving a hole at the center thereof. In addition, the bearing holder is bent outward into a racing-track-like shape, to form the flange F1 such that it faces the end portion. The case C1 and the bearing holder are assembled in the same manner as in the previous embodiment. Two portions of the flange F1 are bent along the axial direction to be coplanar with the planar portions He1 and He2 of the case C1, which form fixing portions F1 a for use in fixing to a PCB by soldering.

Figure 6:
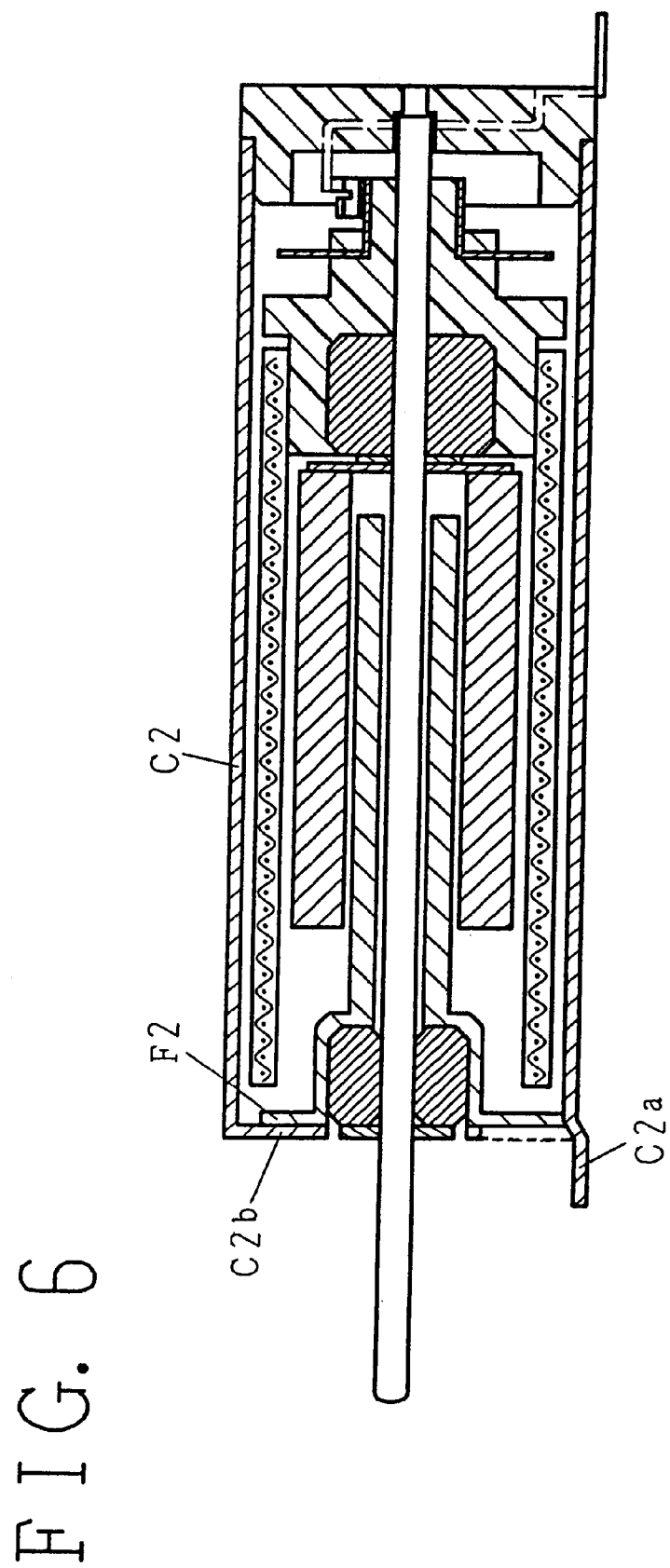
FIG. 6 is a sectional view of still another embodiment of the slim cylindrical coreless vibrator motor shown in FIG. 5.
Figure 7:
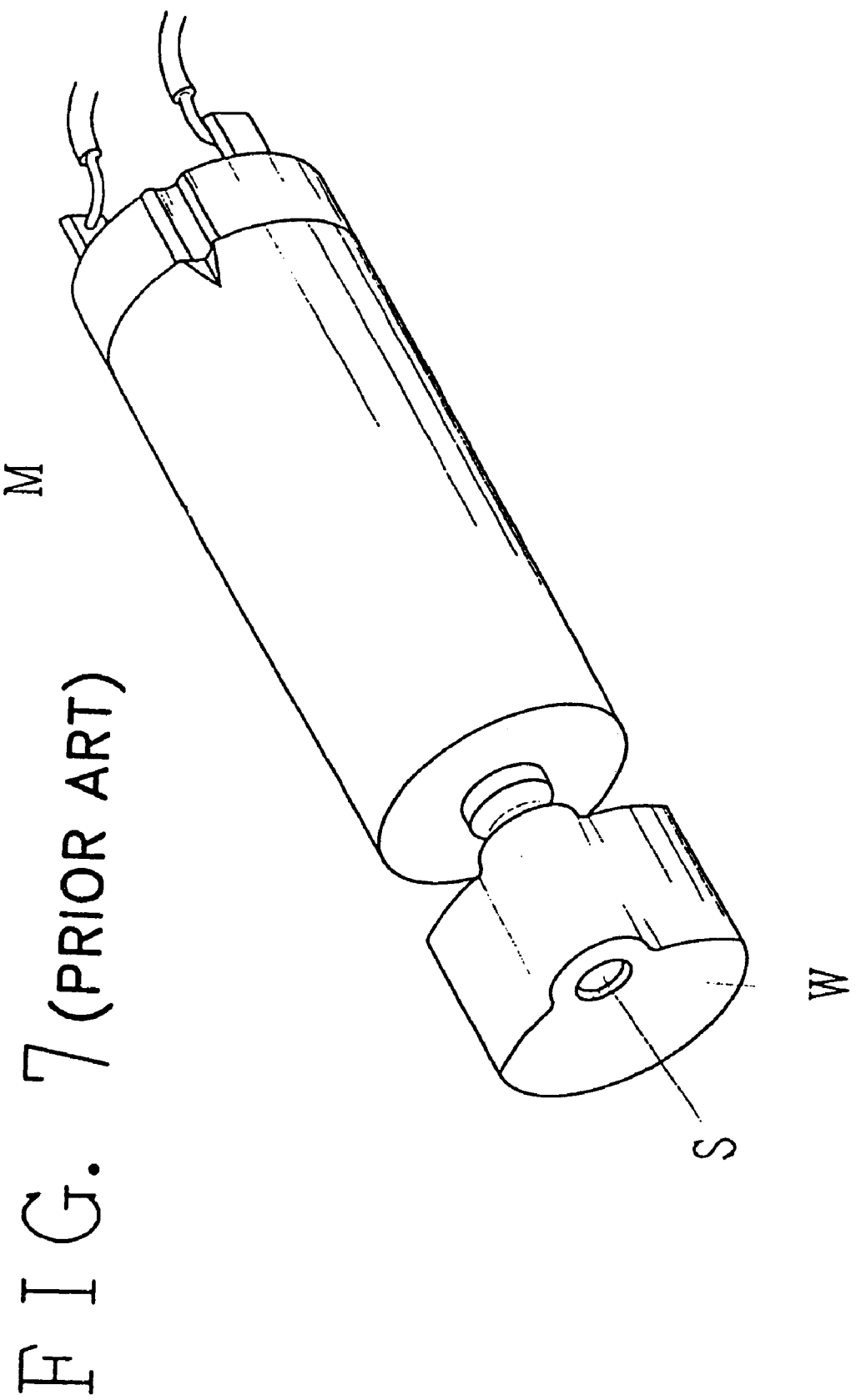
FIG. 7 is a perspective view of a conventional slim cylindrical coreless vibrator motor having an eccentric weight.
Figure 8:
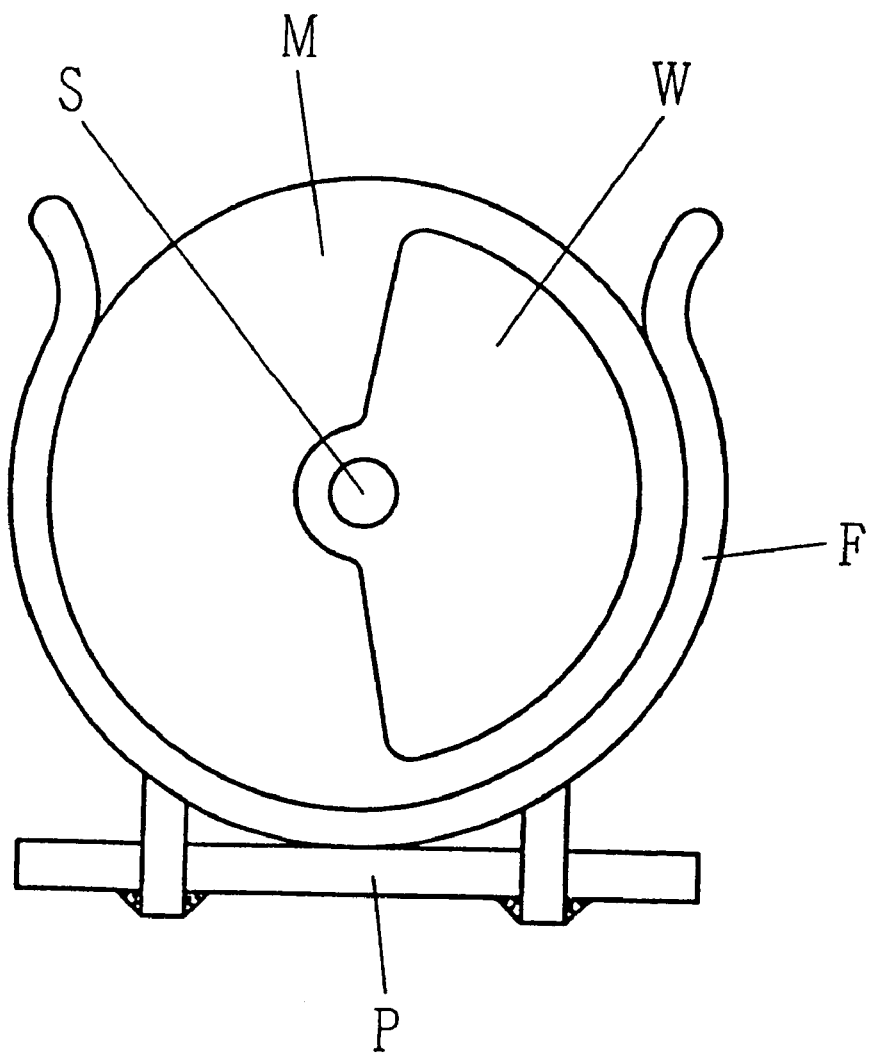
FIG. 8 is a side view of the conventional motor shown in FIG. 8 in the axial direction, showing a state where the motor is mounted on a printed circuit board.

The bent portion of the case C1, having a hole at the center thereof, is overlapped with the flange F1, wherein the flange F1 is placed farther out than the bent portion of the case C1, and then coupled by spot welding. Alternatively, as shown in FIG. 6, the flange F2 may be placed closer in than the end portion C2b which is formed by bending the case C2. For this case, the fixing portion C2a is formed by bending outward the end portion C2b, as shown in FIG. 6.

The slim cylindrical coreless motor according to the present invention, having the above-described configuration, can reduce the mounting area and can be mounted on a PCB by soldering without increasing the circumference thereof. The fixing portions can be formed in combination with the bearing holder or the housing, without requiring additional parts. Also, the fixing portions used for fixing the motor to a board by soldering are formed within the circumference of the housing, thereby reducing mounting area on the PCB. In addition, some of the fixing portions may be used as a power supply terminal. A weight with a recessed portion can be installed eccentrically at the output end of the shaft. The recessed portion of the weight does not need to increase the length of the shaft and allows for free rotation of the weight without interference of the fixing portions.

Although the preferred embodiments are described with reference to the slim cylindrical coreless motor having a circular or race track-like cross section, it is appreciated that the slim cylindrical coreless motor can be formed with a differently shaped cross section, for example, with a polygonal or hexagonal cross section.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. A tubular coreless motor comprising:
   a tubular case having an outer circumferential diameter, an axis defining an axial direction, a first end, a second end, and an end bracket at the second end;
   a bearing holder mounted to the tubular case at the first end and extending into the tubular case, the bearing holder including
      a support portion for a bearing located and proximate the first end of the tubular case, and
      a tubular magnetic return path plate extending from the support portion toward the second end of the tubular case;
   a bearing located in the support portion of the bearing holder;
   a first mounting portion protruding outwardly from the outer circumferential diameter of the tubular case, along the axial direction, at the first end of the tubular case;
   second mounting portions located at the end bracket and protruding outwardly from the outer circumferential diameter of the tubular case at the second end of the case, at least part of the second mounting portions providing a power supply terminal;
   a tubular magnet coaxial with and outside the magnetic return path plate;
   a tubular coreless coil coaxial with, outside, and separated from the tubular magnet by a diametric gap;
   a commutator located at an end of the tubular coreless coil;
   a shaft extending in the axial direction, fixed to the commutator, and rotatably supported by the bearing;
   a weight eccentrically mounted on the shaft outside of the tubular case at the first end and having a recess for preventing collisions with the first mounting portion upon rotation of the shaft; and
   a pair of brushes located at the end bracket and connected to at least part of the second mounting portions for supplying electrical power to the tubular coreless coil through the commutator, the first and second mounting portions being arranged for mounting of the coreless motor directly on a printed circuit board with the shaft parallel to the printed circuit board.

* * * * *